United States Patent [19]

Balitch

[11] 4,449,357

[45] May 22, 1984

[54] TRACK CHAIN LINK AND FORGING PROCESS FOR THE MANUFACTURE OF TRACK CHAIN LINKS

[75] Inventor: Paul Balitch, Grenoble, France

[73] Assignee: Caterpiller Tractor Co., Peoria, Ill.

[21] Appl. No.: 398,176

[22] Filed: Jul. 14, 1982

[30] Foreign Application Priority Data

Jul. 24, 1981 [FR] France .................. 81 14496

[51] Int. Cl.³ ............................. B21L 3/04
[52] U.S. Cl. ........................ 59/30; 59/35.1
[58] Field of Search .......... 59/30, 35, 84, 1, 8, 59/5, 7; 72/364, 342

[56] References Cited

U.S. PATENT DOCUMENTS

| | | | |
|---|---|---|---|
| 1,111,564 | 9/1914 | Coldren | 59/35.1 |
| 4,037,403 | 7/1977 | Lanz et al. | 59/35.1 |
| 4,265,084 | 5/1981 | Livesay | 59/84 |

FOREIGN PATENT DOCUMENTS 1368336 6/1964 France .
780940 8/1957 United Kingdom .

OTHER PUBLICATIONS

Metalworking Production, vol. 103, No. 1, Jan. 2, 1959, Great Britain, "Making Caterpiller Links From Bar", pp. 7-10.

Primary Examiner—Francis S. Husar
Assistant Examiner—Linda McLaughlin
Attorney, Agent, or Firm—Robert A. McFall

[57] ABSTRACT

The invention described herein concerns a forging process for the manufacture of track chain links, especially for worksite machines and vehicles; this process produces links that conform to the tolerances required by the dimensions and the surface quality of opposed attachment mounting and link contact surfaces and nut seats of finished links without it being necessary to machine these surfaces or nut seats. This process includes heating a metal billet in an electric furnace, the billet having a mass that is approximately equal to that of a finished link, preforming the billet, then flat stamping the heated billet. A combined shaping and levelling step carried out on the stamped piece forms parallel opposed sides and nut seats in predetermined spaced relationship to each other. The resulting link is controllably sized and then subjected to a heat treatment. At the end of this process, which requires no machining, a link is obtained (1) whose opposed surfaces (10,11) and nut seats (32,33) have geometric and dimensional relationships that are conform to the limits of the required tolerances.

10 Claims, 15 Drawing Figures

TRACK CHAIN LINK AND FORGING PROCESS FOR THE MANUFACTURE OF TRACK CHAIN LINKS

DESCRIPTION

1. Technical Field

This invention relates generally to a forging process for the manufacture of track chain links for use on construction and worksite vehicles, agricultural equipment, military and other vehicles. In particular, the forging process makes it possible to obtain links whose opposed attachment mounting and link contact surfaces and nut seats have the dimensional and geometric precision and surface quality that correspond to the strict tolerance margins required for this type of manufacturing, without it being necessary to mill the opposed surfaces and broach the nut seats.

2. Background Art

In the techniques now used, track chain links are forged from a metal billet with extra thickness formed on the opposed link contact and attachment mounting surfaces, that is, the surface designed to come into contact with the suspension and track rollers, and the opposite surface for the mounting of the track shoe, and also on the two attachment nut seats. This extra thickness is then reduced by milling both of the opposed surfaces and broaching the nut seats.

It has heretofore been necessary to provide this extra thickness to allow for the subsequent removal, by machining, of exterior parts of the link which, when the initial billet was first heated in a combustion furnace, were decarburized or otherwise adversely affected. The machining must be carried out with great precision because it is aimed at giving the opposed surfaces and nut seats of the link a size, shape and surface quality that are sufficiently precise to ensure that the track chain will operate correctly.

As all manufacturers of links know, this forging process has several drawbacks. In the first place, it requires the preparation of an initial billet having a surplus of metal corresponding to the thickness that must be machined down, which has an obvious effect on the cost of heating the billet. Furthermore, for technical reasons that are well known to metallurgists, the milling of the opposed surfaces of the link must be done in the cold state before the final heat treatment. Thus, a link that has been heated during the first steps of the forging cycle must be cooled to a very low temperature in order to be milled, and then reheated for the following heat treatment, all of which obviously consumes a great deal of energy.

Finally, it should be kept in mind that precision milling and broaching are very long and complex operations, which require costly machines and tooling.

In conclusion, the operation of the conventional process for forging links exhibits a number of constraints and is unsatisfactory with regard to cost, due to the necessity of milling the opposed surfaces and broaching the nut seats in the links. This is why the Applicant has endeavoured to develop a forging process for the manufacture of track chain links that will comply with the tolerances required by the dimensions, shape and surface quality of the opposed surfaces and the nut seats of the finished links without requiring that they be milled and broached.

The present invention is directed to overcoming one or more of the problems as set forth above.

DISCLOSURE OF THE INVENTION

In one aspect of the invention, a forging process for the manufacture of a track chain link includes:

heating a metal billet having a mass equivalent to the mass of a finished link and the mass of the normal amount of flash and burrs remaining after a subsequent forging operation, in an electric furnace at normal forging temperatures;

preforming of the heated billet in a press to a first predetermined dimension, the first predetermined dimension being greater than the final nominal dimensions of the finished link in the heated state;

flat stamping the preformed piece to the nominal dimensions of the finished link in the heated state;

simultaneously shaping and precision levelling the stamped piece in the heated state;

controllably sizing the link including forming an attachment mounting surface and an opposed link contact surface at a predetermined distance one from the other, the opposed surfaces being parallel with respect to each other;

hardening and tempering the sized link; and, machining bores and drilling the attachment holes for the track shoe in the hardened link.

In providing for the heating of the initial billet in an electric furnace, the newly invented process avoids decarburization and the formation of surface deposits on the exterior parts of the link. The dimensional precision and the surface quality of the opposed surfaces and the nut seats is then directly obtained by hot levelling which is, in fact, high precision de-burring. Combined shaping and levelling ensures perfect parallelism between the articulation planes of a link, while the sizing operation, which follows, is designed to make up for dimensional variations resulting from heat dilation and also to correct any possible defects in the parallelism between the opposed surfaces.

In addition to eliminating the complex and costly operations of milling the opposed surfaces and broaching the nut seats, the process according to the present invention makes it possible to forge the link from a billet having a smaller mass, thus saving energy when heating the billet. Furthermore, the hardening of the link can be carried out immediately following sizing thus making it possible to utilize the residual forging temperature for this operation.

As a result of the present invention, profitability is increased during the forging operation through economizing both material and energy.

BRIEF DESCRIPTION OF THE DRAWINGS

FIG. 9 is a schematic representation of the fifth step of the process of an embodiment of the present invention showing sizing of the link.

BEST MODE FOR CARRYING OUT THE INVENTION

Figure 15:
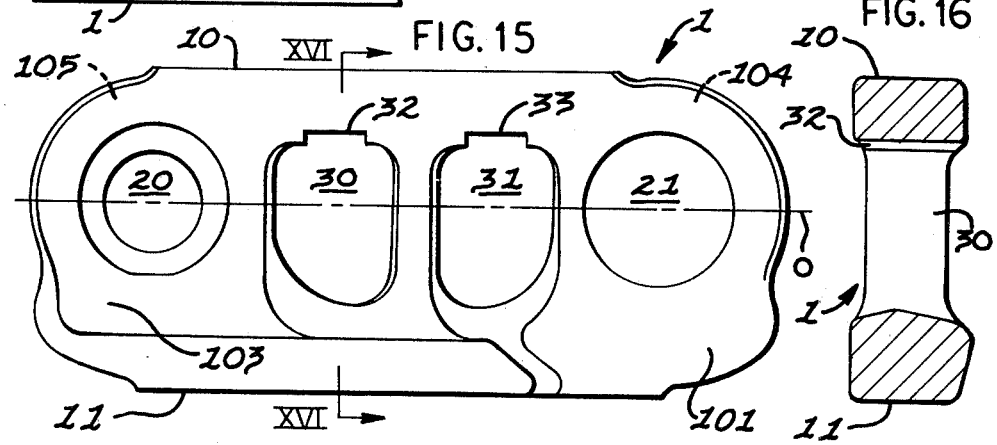
FIG. 15 is a cross-section view along the line XVI—XVI of FIG. 14.
Figure 14:
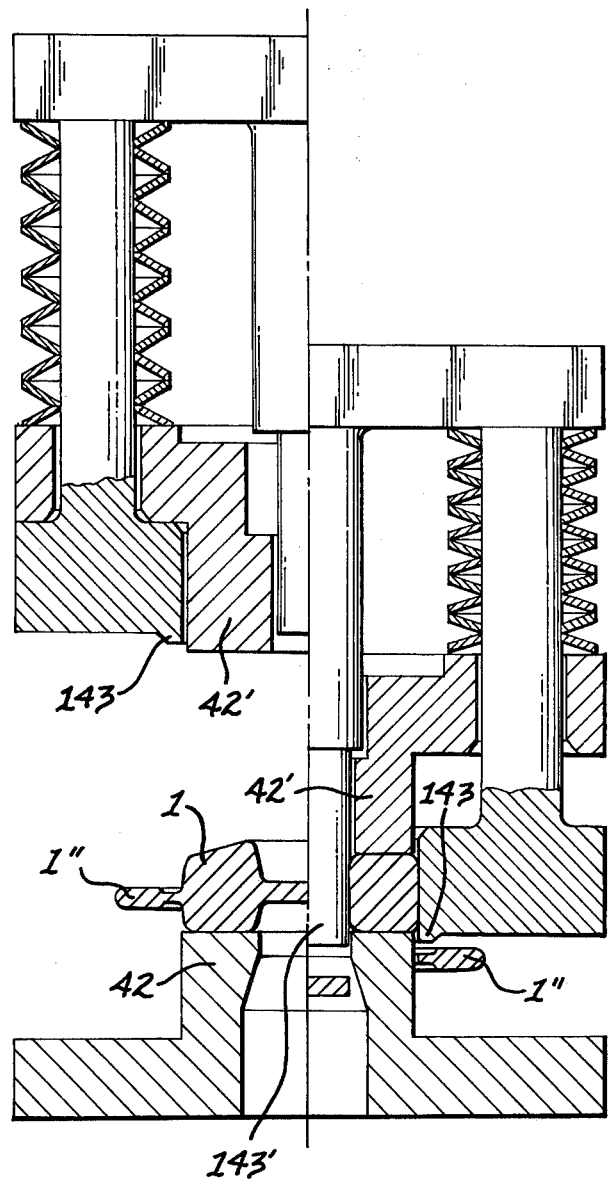
FIG. 14 is an elevated view of the track chain link obtained using the forging process according to an embodiment of the invention.

As shown in FIGS. 14 and 15, a track chain link obtained using the forging process according to the present invention includes an oblong steel body 1, having two opposed surfaces, an upper attachment mounting surface 10 and a lower link contact surface 11. The upper surface 10 is used, more precisely, for mounting a track shoe, not shown, while the lower surface is designed to roll on a plurality of bogie rollers, drive and idler wheels, also not shown. The body 1 is drilled with two bores 20, 21 for the hinge pins of the link, and also includes two apertures 30, 31 in which, respectively, a pair of nut seats 32, 33 are formed. The nut seats 32, 33 act as seats for a pair of attachment nuts, not shown, to secure the track shoe to the link body. A plurality of respectively parallel articulation planes 101, 103, 104, 105, of the link are formed perpendicular to the bores 20 and 21.

The opposed surfaces 10, 11, as well as the nut seats 32, 33 must have very precise shapes, dimensions and surface quality, constructed to very strict tolerances, and they must be perfectly parallel to a plane containing the axis of the two bores 20, 21. Furthermore, the articulation planes 101, 103, 103, 105 of the link must be perfectly parallel. These rigid conditions are necessary first of all, in order to guarantee a solid and durable attachment of the track shoe on the link and secondly, to ensure the correct operation, on a worksite vehicle, for example, of a track chain formed by links joined end to end.

Heretofore, using conventional processes it was only possible to obtain these results by using complex precision machining, which was both long and costly, to complete the conventional forging operations.

The forging process according to the present invention yields the same results and even improves upon them in carrying out the successive steps described hereunder in reference to FIGS. 1 to 13.

Figure 1:
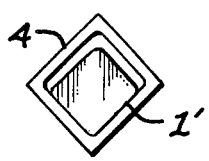
FIG. 1 is a schematic representation of the first step of the process according to an embodiment of the present invention, the heating of a metal billet in an electric furnace.

The operation begins with a metal billet 1' having a mass corresponding to that of a link that is normally obtained after the finishing of the opposed surfaces 10, 11 and the nut seats 32, 33, increased by the normal percentage left for burrs and flash. The billet 1' is placed in an electric furnace 4 and heated to normal forging temperature, as shown in FIG. 1. The electric furnace 4 is preferably an induction furnace. The electrically heated billet 1' retains its initial metallurgical properties and, in particular, is not subject to decarburization or formation of surface defects.

Figure 2:
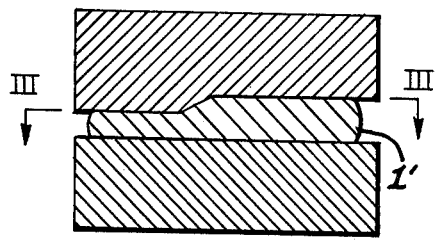
FIG. 2 is a schematic representation of the second step of the process of an embodiment of the present invention showing the preforming of the heated billet.
Figure 3:
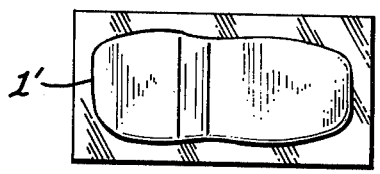
FIG. 3 is a view along the line III—III of FIG. 2.

In the following step, illustrated by FIGS. 2 and 3, the heated billet 1' is preformed to a first predetermined dimension in a press. This operation gives the billet the general exterior shape of the desired link, its dimensions exceeding the final heated nominal dimensions of this link.

Figure 4:
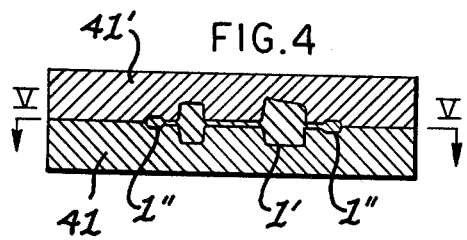
FIG. 4 is a schematic representation of the third step of the process of an embodiment of the present invention showing the flat stamping of the preformed piece.
Figure 5:
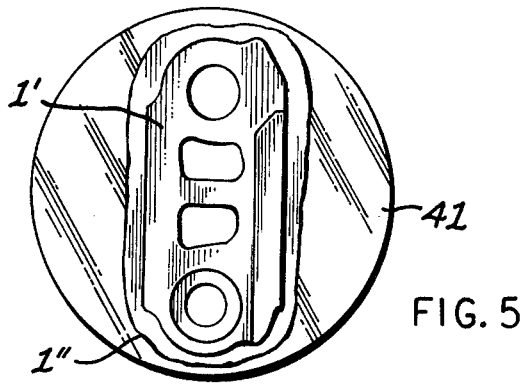
FIG. 5 is a plan view along the line V—V of FIG. 4.

Next comes the step shown in FIGS. 4 and 5 which consists of flat stamping the heated, preformed piece between two half stamping dies 41-41', reproducing, except for burrs and flash, the definitive shape of the desired link, including the bores 20, 21 and the apertures 30, 31. The half stamping dies 41, 41' have precision molds so that the piece stamped is formed to a second predetermined dimension having the precise nominal heated dimensions of the desired link with extra thickness being limited to the thickness of the flash 1" and the burrs 1''' at the level of the joint plane.

Figure 6:
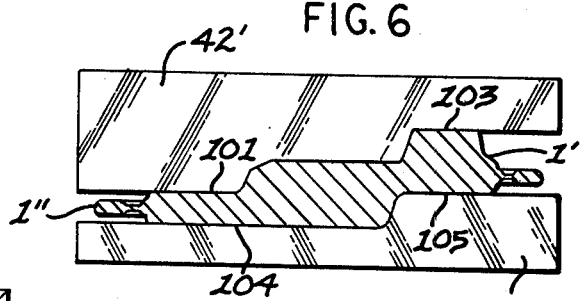
FIG. 6 is a schematic representation of a side view of the fourth step of the process of an embodiment of the present invention showing shaping and levelling of the stamped article.
Figure 7:
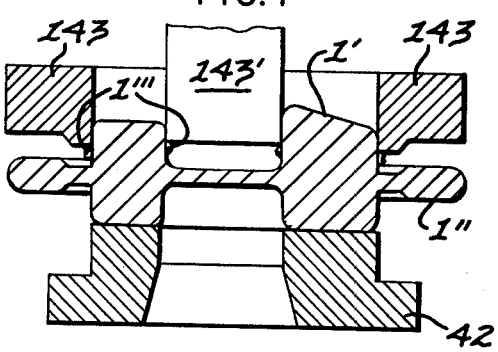
FIG. 7 is a schematic representation of a second side view of the fourth step of the process of an embodiment of the present invention showing shaping and levelling of the stamped article.
Figure 8:
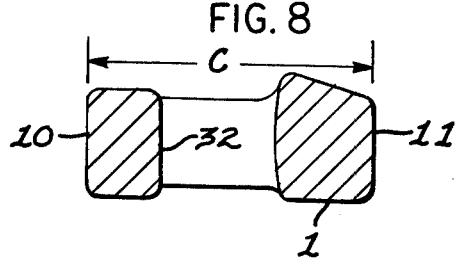
FIG. 8 shows the article obtained after the operation shown in FIGS. 6 and 7.
Figure 13:
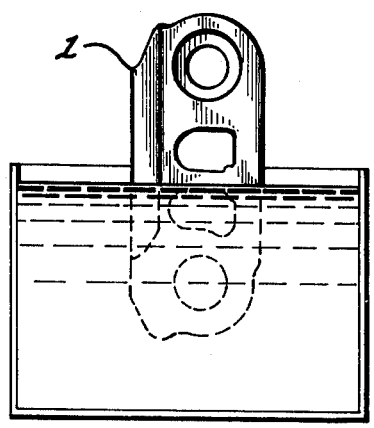
FIG. 13 is a more detailed view of the apparatus of FIG. 7, showing the apparatus in a rest position on the left half and in a working position on the right half.

The following step, shown in FIGS. 6 to 8, consists of simultaneously shaping and hot precision levelling of the stamped piece. This double operation is carried out using a special tool as shown in FIG. 13. First, the stamped piece is laid flat in a lower half stamping die 42 and compressed at a predetermined pressure with an upper half stamping die 42'. The contact surfaces of the half stamping dies 42, 42' are precision graded so that the lateral surfaces of the link are given their definitive shape and, in particular, so that the articulation planes 101, 103, 104, 105 of the link are formed perfectly parallel with respect to each other and have precisely controlled dimensions. Once the shaping has been carried out and the link is held in place by the stamping dies, a pair of cutters 143 and 143', which are part of the same tool assembly, are brought down vertically along the sides to be levelled to shear them. This levelling operation is not only designed to eliminate the burrs and flash from the stamping, but especially to give the opposed surfaces 10, 11 and the nut seats 32, 33 of the link their precise heated dimensions and a high quality surface finish. In order to do this, the cutters 143, 143' are precision ground and their respective positions are precisely adjusted. The levelling of the opposed surfaces 10, 11 and the nut seats 32, 33 in fact replaces the milling and broaching operations of the conventional processes while giving comparable results. It goes without saying that in view of this levelling, the flash 1" of the stamped piece must be sufficiently thick at the start of the operation.

The simultaneous shaping and levelling operation produces a link 1 shown in FIG. 8, with its nominal dimensions in the heated state. The flash 1" resulting from this same operation is shown in the right half of FIG. 13.

At this stage of the process, the links are at a temperature that may vary from one link to another. Experiments have shown that these temperatures range from about 800° C. to about 900° C. The resulting heat variations inevitably produce dispersions in the dimension 'C' shown in FIG. 8, between the opposed surfaces 10 and 11, which can cause the link to exceed the required tolerances. For this reason, the invented process includes an essential step involving the controlled sizing of the link, illustrated in FIGS. 9 and 10. This controlled sizing is aimed at correcting the variations that appear in the dimension 'C' and at precisely adjusting the parallelism between the two opposed surfaces 10 and 11 and at refining their surface finish.

More precisely, this controlled sizing operation consists of placing the link 1 on one of its opposed surfaces 10, 11 between two reference planes 44, 44' that are precision calibrated and connected by adjustable stops 144; the height of the stops 144 being precisely adjusted to the dimension 'C' that is to be obtained between the two opposed surfaces 10 and 11 of the link. Thus, the controlled sizing operation forms an attachment mounting surface 10 and an opposed link contact surface 11 at a predetermined distance 'C' from each other and in precise parallel relationship to each other.

Figure 11:
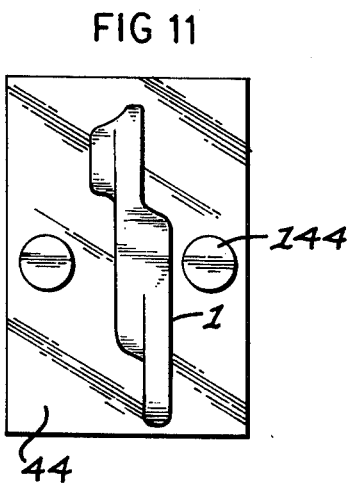
FIG. 11 is a schematic representation of an alternate step including heat stabilization of the link before sizing.

Preferably, the sizing operation is carried out after the temperature of the link has been stabilized at a predetermined constant level. The tests carried out by the Applicant have shown that the sizing operation yields better results when this temperature is stabilized at approximately 830° C. This stabilization of the temperature is preferably carried out by cooling the link after the preceeding step of simultaneously shaping and levelling to a constant temperature that is below the predetermined stabilization temperature and then reheating the link to the predetermined temperature. This has certain advantages in that the link is left to cool in the air to 800° C. in order to cover the entire interval which includes the temperature of the link as it comes out of the shaping and levelling operation. The link is then reheated to 830° C. by being sent through an induction tunnel 45, as shown in FIG. 11, at the end of which it has acquired a precisely controlled constant temperature. The link is then immediately controllably sized.

Figure 12:
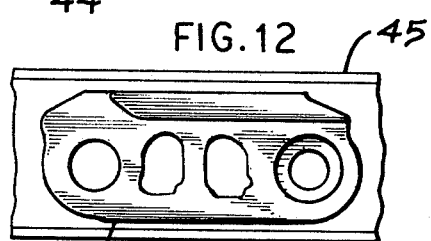
FIG. 12 is a schematic representation of part of the alternate step shown in FIG. 11, showing immersion hardening of the piece.

The hardening operation which follows desirably comes immediately after the sizing operation. If this is the case, considerable conservation of energy can be made in that the residual forging temperature can be used for this hardening. Hardening is preferably carried out by immersion in a liquid as is shown in FIG. 12. Next comes a conventional tempering operation. The process of the present invention ends with shot blasting, testing of the finish and conditioning of the link. The link is then ready to have its hinge pin bores 20, 21 machined and the track shoe attachment holes 30, 31 drilled.

Industrial Applicability

The process of the present invention produces finished track chain links that meet the required tolerances, and do not require machining of the opposed surfaces and the nut seats. Further, the process provides considerable savings in raw materials and energy and it can be carried out continuously. In addition, the geometric and dimension relationship of various surfaces on the link as well as the quality of the surface finish are greatly improved over the previously known conventional processes. In particular, during the controlled sizing operation, the precision of the adjustments and the rigor with which the temperature of the link is controlled assure control of the dimension between the attachment mounting surface 10 and the link contact surface 11 that is not provided by any other economically applicable process.

I claim:

1. A forging process for the manufacture of track chain links, including the steps of:
   heating a metal billet (1') having a mass substantially equivalent to that of a finished link and the mass of the flash (1") and burrs (1''') remaining after a subsequent levelling operation, said heating being carried out in an electric furnace;
   preforming the heated billet (1') in a press to a first predetermined dimension, said first predetermined dimension being greater than final desired dimensions of the finished link in a heated state;
   flat stamping the preformed piece to nominal dimensions of the finished link in a heated state;
   simultaneously shaping and precision levelling the stamped piece in the heated state, including removing the burrs (1''') and flash (1") from the link and forming a plurality of parallel articulation planes (101, 103, 104, 105) on lateral surfaces of the link;
   controllably sizing the link (1) including forming an attachment mounting surface (10) and an opposed link contact surface in parallel relationship (11) at a predetermined distance one from the other;
   hardening and tempering the sized link (1); and,
   machining a pair of bores (20, 21) and drilling a pair of attachment holes (30, 31) for a track shoe in the hardened link (1).

2. The forging process, as set forth in claim 1, wherein the hardening operation is carried out immediately after controllably sizing the link (1).

3. The forging process, as set forth in claim 1, wherein the step of flat stamping the preformed piece includes compressing the preformed piece between two half stamping dies (41, 41') and forming the nominal dimension and shape of the desired link (1).

4. The forging process, as set forth in claim 1, wherein the step of simultaneously shaping and precision levelling of the stamped piece includes compressing the stamped piece between two half stamping dies (42, 42') at a predetermined pressure, and subsequently lowering a pair of cutters (143, 143') and contacting the attachment mounting surface (10), the link contact surface (11), and the nut seat surfaces (32, 33).

5. The forging process, as set forth in claim 1, wherein the step of controllably sizing the link (1) includes placing the link (1) on one of the opposed surfaces (10, 11) between two reference planes (44, 44') connected by at least one adjustable stop (144), said stop (144) being adjusted to space the reference planes (44, 44') a predetermined distance (C) one from the other.

6. The forging process, as set forth in claim 1, wherein the step of controllably sizing the link (1) is carried out after stabilization of the temperature of the link (1) at a predetermined constant temperature.

7. The forging process, as set forth in claim 6, wherein the temperature of the link (1) is stabilized at approximately 830° C.

8. The forging process, as set forth in claim 6, wherein the stabilization of the temperature of the link (1) in preparation for the step of controllably sizing the link (1) includes cooling the levelled link to a constant temperature that is below said predetermined temperature and subsequently reheating the link (1) to said predetermined temperature.

9. The forging process, as set forth in claim 8, wherein the temperature to which the levelled link (1) is cooled is approximately 800° C.

10. The forging process, as set forth in claim 8, wherein the step of reheating the link (1) takes place in an induction tunnel (45).

* * * * *

UNITED STATES PATENT AND TRADEMARK OFFICE
CERTIFICATE OF CORRECTION

PATENT NO. : 4,449,357
DATED : May 22, 1984
INVENTOR(S) : Paul D. Balitch

Figure 10:
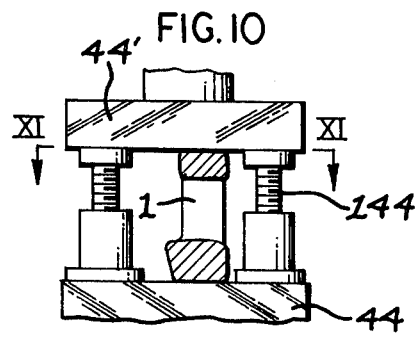
FIG. 10 is a plan view taken along the line XI—XI of FIG. 9.
Figure 16:

It is certified that error appears in the above-identified patent and that said Letters Patent are hereby corrected as shown below:

In the drawings, Sheet 2, "Fig. 10" should read --Fig. 9--;
"Fig. 11" should read --Fig. 10--;
"Fig. 12" should read --Fig. 11--;
"Fig. 13" should read --Fig. 12--;
"Fig. 15" should read --Fig. 14--; and
"Fig. 16" should read --Fig. 15--.
Sheet 3, "Fig. 14" should read --Fig. 13--.

Signed and Sealed this

Sixteenth Day of October 1984

[SEAL]

Attest:

GERALD J. MOSSINGHOFF

Attesting Officer    Commissioner of Patents and Trademarks